US006663917B2

(12) United States Patent
Gebhart et al.

(10) Patent No.: US 6,663,917 B2
(45) Date of Patent: Dec. 16, 2003

(54) AQUEOUS COATING COMPOSITION WITH IMPROVED ADHESION TO FRIABLE SURFACES

(75) Inventors: Matthew Stewart Gebhart, New Britain, PA (US); Kathleen Anne Koziski, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/301,006

(22) Filed: Nov. 21, 2002

(65) Prior Publication Data

US 2003/0157258 A1 Aug. 21, 2003

Related U.S. Application Data

(62) Division of application No. 09/965,379, filed on Sep. 27, 2001, now Pat. No. 6,509,064.
(60) Provisional application No. 60/239,458, filed on Oct. 11, 2000.

(51) Int. Cl.$^7$ .............................. B05D 3/02; B05D 5/00
(52) U.S. Cl. ...................................... 427/393; 427/393.6
(58) Field of Search ............................... 427/393, 393.6

(56) References Cited

U.S. PATENT DOCUMENTS

| 4,722,965 A | 2/1988 | Wong et al. |
| 4,771,100 A | 9/1988 | Das et al. |
| 5,035,944 A | 7/1991 | Frazza et al. |
| 5,202,378 A | 4/1993 | Barnett |
| 5,534,310 A | 7/1996 | Rokowski et al. |
| 5,744,540 A | 4/1998 | Baumstark et al. |
| 6,060,532 A | 5/2000 | Frankel et al. |
| 6,258,887 B1 | 7/2001 | Bardman et al. |

FOREIGN PATENT DOCUMENTS

| EP | 522789 | 1/1993 |
| EP | 0658608 | 5/2000 |
| EP | 1008635 | 6/2000 |
| GB | 1 354 436 | 5/1974 |
| JP | 08-283611 | 10/1996 |

*Primary Examiner*—Erma Cameron
(74) *Attorney, Agent, or Firm*—Carl P. Hemenway; Stephen T. Falk

(57) ABSTRACT

An aqueous coating composition having improved adhesion to friable surfaces is provided. The aqueous coating composition includes a plurality of polymeric particles having a particle size of less than 120 nanometers, and containing at least two polymers, one of which contains, as polymerized units, acid functional monomers, water soluble monomers, or both. Optionally, the aqueous coating composition includes a nonionic surfactant. In addition, a method for improving adhesion to friable surfaces by using the aqueous coating compositions of the invention is provided.

9 Claims, No Drawings

AQUEOUS COATING COMPOSITION WITH IMPROVED ADHESION TO FRIABLE SURFACES

This is a Divisional Application of prior application Ser. No. 09/965,379, filed Sep. 27, 2001, now U.S. Pat. No. 6,509,064 which claims the benefit of Provisional Application Ser. No. 60/239,458, filed Oct. 11, 2000.

The present invention relates to an aqueous coating composition providing improved adhesion to friable surfaces such as chalky weathered paint surfaces and masonry surfaces and to a method for producing a coating on a friable surface.

Coatings are frequently desirably applied to surfaces which are both porous and weak, i.e., subject to attrition on abrasion such as, for example, chalky surfaces of coatings which have weathered to an extent that poorly consolidated pigment forms a surface layer on the coating and masonry surfaces, weathered or not, which have a poorly consolidated surface. A substrate to which a coating is applied may have an entirely friable surface or only portions of the surface may be friable. Such substrates present a problem to the applicator in that, without being bound by this mechanism, the aqueous coating composition may not penetrate the weak boundary layer of the friable surface or friable surface areas sufficiently to provide a dry coating with the requisite degree of adhesion to the substrate below the weak surface.

U.S. application Ser. No. 4,771,100 discloses the use of ethoxylated fatty amines in the preparation of single stage latexes containing about 0.1 to 10 weight percent of copolymerized carboxylic acid monomer which have particle sizes between 889 and 1091 Angstroms for use as coatings. No use of these single stage latexes, in combination with ethoxylated fatty amines, to improve adhesion to friable surfaces was disclosed.

U.S. application Ser. No. 5,035,944 discloses a method for treating surfaces, including those of wood, plastic, and cementitious substrates to provide coatings having superior appearance with respect to gloss and hardness. The substrates were treated with aqueous coating compositions including particles of polymer of size 20 to 70 nanometers, having at least two mutually incompatible copolymers in separate phases. The outer portion of the particle was predominately a phase containing a copolymer having a Tg significantly lower than that of copolymer making up the predominate phase of the inner portion (core) of the particle. Preferably, the outer phase copolymer had a low Tg of less than 35° C., while the inner (core) phase copolymer had a high Tg of at least 45° C. The copolymer of the outer phase had a weight average molecular weight ($M_w$) of 50,000 to 10,000,000, while the copolymer of the inner (core) phase of the particle had an $M_w$ of 1,000,000 to 10,000,000. The disclosed particles achieve improved hardness while maintaining good film forming performance by surrounding an inner (core) phase polymer that is hard (i.e., having Tg well above room temperature, and molecular weight of at least 1,000,000) under ambient conditions with an outer phase polymer that is soft and flowable (i.e., having Tg near or below room temperature, and $M_w$ as low as 50,000). No use of these multi-stage latexes to improve adhesion to friable surfaces was disclosed.

We have now prepared aqueous coating compositions including, dispersed therein, a plurality of polymeric particles having an average particle size of less than 120 nanometers, each polymeric particle including at least one polymer A and at least one polymer B. Polymer A contains, as polymerized units, substantial amounts of acid functional monomers, water soluble monomers, or both. The total amount of acid functional monomers, or water soluble monomers, or both, contained, as polymerized units, in Polymer B is less that the total amount contained in Polymer A. We have, surprisingly, found that these compositions exhibit improved adhesion to chalky weathered surfaces when compared with aqueous coating compositions in which the polymeric particles have been prepared in a single polymerization stage. We have also discovered that the presence of nonionic surfactants further improves the adhesion to chalky weathered surfaces observed for aqueous coating compositions containing the plurality of polymeric particles, each of which includes at least one polymer A and at least on polymer B.

Used herein, these terms, enclosed in quotation marks, are defined as follows:

"friable surface" refers to porous, weak surfaces subject to attrition on abrasion and includes: chalky surfaces of coatings which have weathered to an extent that poorly consolidated pigment forms a surface layer on the coating; masonry surfaces, weathered or fresh, which have a poorly consolidated surface; wall board; weathered uncoated wood; and gypsum.

"polymerization stage" refers to the time interval during which a monomer or a mixture of monomers is polymerized to form polymer;

the "polymeric particles" have an average particle size of less than 120 nanometers, exist in large numbers (i.e., as a "plurality of polymeric particles") and are prepared by emulsion polymerization accomplished in two or more polymerization stages, at least one polymerization stage of which produces "polymer A", and at least one polymerization stage of which produces "polymer B";

"Polymer A" is characterized in that it has either a higher acid number compared to "polymer B", or that it is prepared from a monomer mixture containing 5–99.5% of at least one water soluble monomer, or both; and "water soluble" means that the monomer has a water solubility of 8% or more by weight, based on the weight of water, as calculated by the QSAR Method (see Table A below).

"Acid number" is a convenient indicator of the amount of acid functionality contained in a polymer. "Acid number" is defined as the number of milligrams of potassium hydroxide required to neutralize the free acid in one gram of polymer solids.

$$\text{Acid Number} = \frac{(\text{mg of KOH})}{(\text{g of polymer sample})}$$

The present invention relates to an aqueous coating composition having improved adhesion to friable surfaces including a plurality of polymeric particles, each of said particles including:

(a) at least one polymer A having a glass transition temperature of −20° C. to 100° C.,
  wherein said polymer A is an emulsion polymer consisting essentially of:
  (i) at least one copolymerized ethylenically unsaturated nonionic monomer having a water solubility less than 8% by weight, based on the weight of water; and
  (ii) at least one copolymerized acid monomer, such that the acid number of said polymer A is 13 to 260; and (b) at least one polymer B having a glass transition temperature of −20° C. to 100° C.,
    wherein said polymer B is an emulsion polymer including, as polymerized units, at least one ethylenically unsaturated nonionic monomer,
    wherein said particles have an average particle diameter less than 120 nanometers.

A second aspect of the present invention relates to an aqueous coating composition having improved adhesion to friable surfaces including a plurality of polymeric particles, each of said particles including:
(a) at least one polymer A having a glass transition temperature of −20° C. to 100° C.,
    wherein said polymer A is an emulsion polymer including:
    (i) 5–99.5% by weight, based on said polymer A weight, of at least one copolymerized ethylenically unsaturated first nonionic monomer having a water solubility of 8% or more by weight, based on the weight of water;
    (ii) 0–94.5% by weight, based on said polymer A weight, of at least one copolymerized ethylenically unsaturated second nonionic monomer having a water solubility of less than 8% by weight, based on the weight of water; and
    (iii) at least one copolymerized acid monomer, such that the acid number of said polymer A is 3 to 100; and
(b) at least one polymer B having a glass transition temperature of −20° C. to 100° C.,
    wherein said polymer B is an emulsion polymer including, as polymerized units, at least one ethylenically unsaturated nonionic monomer,
    wherein said particles have an average particle diameter less than 120 nanometers.

A third aspect of the present invention relates to a method for producing a coating on a friable surface including:
(1) applying to said friable surface a layer of an aqueous coating composition including a plurality of polymeric particles, each of said particles including:
    (a) at least one polymer A having a glass transition temperature of −20° C. to 100° C.,
        wherein said polymer A is an emulsion polymer consisting essentially of:
        (i) at least one copolymerized ethylenically unsaturated nonionic monomer having a water solubility less than 8% by weight, based on the weight of water; and
        (ii) at least one copolymerized acid monomer, such that the acid number of said polymer A is 13 to 260; and
    (b) at least one polymer B having a glass transition temperature of −20° C. to 100° C.,
        wherein said polymer B is an emulsion polymer including, as polymerized units, at least one ethylenically unsaturated nonionic monomer,
        wherein said particles have an average particle diameter less than 120 nanometers; and
(2) drying said coating composition.

A fourth aspect of the present invention relates to a method for producing a coating on a friable surface including:
(1) applying to said friable surface a layer of the aqueous coating composition including a plurality of polymeric particles, each of said particles including:
    (a) at least one polymer A having a glass transition temperature of −20° C. to 100° C.,
        wherein said polymer A is an emulsion polymer including:
        (i) 5–99.5% by weight, based on said polymer A weight, of at least one copolymerized ethylenically unsaturated first nonionic monomer having a water solubility of 8% or more by weight, based on the weight of water;
        (ii) 0–94.5% by weight, based on said polymer A weight, of at least one copolymerized ethylenically unsaturated second nonionic monomer having a water solubility of less than 8% by weight, based on the weight of water; and
        (iii) at least one copolymerized acid monomer, such that the acid number of said polymer A is 3 to 100; and
    (b) at least one polymer B having a glass transition temperature of −20° C. to 100° C.,
        wherein said polymer B is an emulsion polymer including, as polymerized units, at least one ethylenically unsaturated nonionic monomer,
        wherein said particles have an average particle diameter less than 120 nanometers; and
(2) drying said coating composition.

In any of the aforementioned aspects of the present invention, the aqueous coating composition may further include at least one nonionic surfactant in the amount 0.25 to 10 weight percent, based on the total dry weight of the polymeric particles.

The aqueous coating composition of the present invention includes a plurality of polymeric particles. Each polymeric particle includes a polymer A and a polymer B. Polymer A and polymer B are formed in separate emulsion polymerization stages. There may be more than one polymer A and more than one polymer B. In fact, polymer formed in a separate stage and dissimilar from polymer A or polymer B (e.g., one having a Tg above 100° C.) may also be present in the particles. Polymer A may be prepared in a polymerization stage either before or after the polymerization stage in which polymer B is prepared. Where there is more than one polymer B, polymer A, or more than one of each, the polymerization stages in which they are formed may be carried out in any order. The glass transition temperatures of both polymer A and polymer B are −20° C. to 100° C. Although it is not a requirement of the present invention, it is preferred, and will usually be the case, that polymer A and polymer B are mutually incompatible. When this incompatibility exists, the polymeric particles may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. The mutual incompatibility of the two polymer compositions may be determined in various ways known in the art. The use of scanning electron microscopy using staining techniques to emphasize the difference between the appearance of the phases, for example, is such a technique.

Particle sizes herein are those determined using a Brookhaven Model BI-90 particle sizer manufactured by Brookhaven Instruments Corporation, Holtsville N.Y. Reported as "effective diameter".

Glass transition temperature, Tgs, used herein are those calculated by using the Fox equation (T. G. Fox, Bull. Am. Physics Soc., Volume 1, Issue No. 3, page 123(1956)), that is, for calculating the Tg of a copolymer of monomers M1 and M2, $$1/Tg(calc.)=w(M1)/Tg(M1)+w(M2)/Tg(M2)$$

,wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers.

Aqueous emulsion polymerization is the preferred method of preparing the polymeric particles because it can produce the desired particle size of less than 120 nanometers. However, any polymerization method that would allow preparation of an aqueous dispersion of polymeric particles having the desired size and each containing both polymer A and polymer B, produced in separate polymerization stages, would be acceptable. Polymeric particles prepared by emulsion polymerization are usually stabilized by adding anionic, nonionic, cationic, or amphoteric surfactants, or by the incorporation of anionic or cationic moieties into the backbone of the polymer itself during synthesis. The emulsion polymerization can be carried out by a number processes such as those described in Blackley, D. C. *Emulsion Polymerisation;* Applied Science Publishers: London, 1975; Odian, G. *Principles of Polymerization;* John Wiley & Sons: New York, 1991; *Emulsion Polymerization of Acrylic Monomers;* Rohm and Haas, 1967.

Aside from the specific compositional requirements for polymer A, to be described later, the following description of compositions and methods of preparation for an emulsion polymer are common to both polymer A and polymer B. The monomers from which these emulsion polymers are formed are ethylenically-unsaturated. When they polymerize in the presence of free radical initiators, these ethylenically-unsaturated monomers form addition polymers. The aqueous emulsion polymer may be prepared by conventional techniques known to those of ordinary skill in the art. The polymer may contain, as polymerized units, ethylenically unsaturated monomers. Examples of these ethylenically unsaturated monomers include: $C_1$–$C_{22}$ linear or branched chain alkyl (meth)acrylates, bornyl (meth)acrylate, isobornyl (meth)acrylate, and the like; hydroxyethyl (meth)acrylate, hydroxypropyl (meth)acrylate; (meth)acrylamide or substituted (meth)acrylamides; styrene or substituted styrenes; butadiene; vinyl acetate or other vinyl ester; N-butylaminoethyl (meth)acrylate, N,N-di(methyl) aminoethyl (meth)acrylate; monomers containing $\alpha,\beta$-unsaturated carbonyl functional groups such as fumarate, maleate, cinnamate and crotonate; (meth)acrylonitrile; and acetoacetoxyethyl (meth)acrylate. Used herein, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

Acid-functional monomers may also be present in the aqueous emulsion polymer as polymerized units. Acid-functional monomers useful in the present invention include, for example, (meth)acrylic acid, itaconic acid, crotonic acid, phosphoethyl (meth)acrylate, sulfoethyl (meth)acrylate, 2-acrylamido-2-methyl-1-propanesulfonic acid, fumaric acid, maleic anhydride, monomethyl maleate, and maleic acid.

Optionally, a low level of a multi-ethylenically unsaturated monomer may be incorporated into the polymer to provide crosslinking. The level of multi-ethylenically unsaturated monomer may be 0–5% by weight, based on the weight of the dry emulsion polymer. The upper limit is typically determined by the point at which film formation becomes impaired. Useful multi-ethylenically unsaturated monomers include, for example, allyl (meth)acrylate, diallyl phthalate, 1,4-butylene glycol di(meth)acrylate, 1,6-hexanediol di(meth)acrylate, and 1,1,1-trimethylolpropane tri(meth)acrylate.

Conventional surfactants may be used to stabilize the emulsion polymerization systems before, during, and after polymerization of monomers. These conventional surfactants will usually be present at levels of 0.1 percent to 6 percent by weight based on the weight of total monomer. At least one anionic, nonionic, or amphoteric surfactant may be used, or mixtures thereof. Examples of anionic emulsifiers include sodium lauryl sulfate, sodium dodecyl benzene sulfonate, dioctylsulfosuccinate, sodium polyoxyethylene lauryl ether sulfate, and sodium salt of tert-octylphenoxyethoxypoly(39)ethoxyethyl sulfate. Examples of nonionic surfactants include glycerol aliphatic esters, oleic acid monoglyceride, polyoxyethylene aliphatic esters, polyoxyethylene glycol monostearate, polyoxyethylene cetyl ether, polyoxyethylene glycol monolaurate, polyoxyethylene glycol monooleate, polyoxyethylene glycol stearate, polyoxyethylene higher alcohol ethers, polyoxyethylene lauryl ether, polyoxyethylene nonylphenol ether, polyoxyethylene octylphenol ether, polyoxyethylene oleyl ether, polyoxyethylene stearyl ether, polyoxyethylenesorbitan aliphatic esters, polyoxyethylenesorbitan monolaurate, polyoxyethylenesorbitan monooleate, polyoxyethylenesorbitan monopalmitate, polyoxyethylenesorbitan monostearate, polyoxyethylenesorbitan trioleate, polyoxyethylenesorbitan tristearate, polyoxyethylenesorbitol tetraoleate, stearic acid monoglyceride, tert-octylphenoxyethylpoly(39) ethoxyethanol, and nonylphenoxyethylpoly(40) ethoxyethanol.

Amphoteric surfactants may also be utilized solely, or in combination with anionic surfactants, nonionic surfactants, or mixtures thereof, to stabilize particles of the polymer during and after aqueous emulsion polymerization, or other dispersion polymerizations. For the purpose of stabilizing particles of polymer in aqueous systems, amphoteric surfactants may be used at levels of 0.1 percent to 6 percent by weight based on the weight of total monomer. Useful classes of amphoteric surfactant include aminocarboxylic acids, amphoteric imidazoline derivatives, betaines, and macromolecular amphoteric surfactants. Amphoteric surfactants from any of these classes may be further substituted with fluorocarbon substituents, siloxane substituents, or combinations thereof. Useful amphoteric surfactants can be found in Amphoteric Surfactants, ed. B. R. Bluestein and C. L. Hilton, Surfactant Series Vol. 12 Marcel Dekker N.Y., N.Y. (1982).

Alternatively, all, or a portion, of the surfactant activity may be provided by initiator fragments, such as those of persulfates, when the fragments become incorporated into the polymer chain.

Incorporating monomers bearing ionic groups into the polymer chain is yet another alternative method of stabilizing the emulsion polymer system. Those monomers bearing ionic groups include the acid-functional monomers described hereinabove.

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization include water-soluble free radical initiators, such as hydrogen peroxide, tert-butyl peroxide, benzoyl peroxide, t-butyl peroxtoate; alkali metal (sodium, potassium or lithium) or ammonium persulfate; azo initiators such as azobisisobutyronitrile or 2,2'-azobis (2-amidinopropane) dihydrochloride; or mixtures thereof. Such initiators may also be combined with reducing agents to form a redox system. Useful reducing agents include sulfites such as alkali metal meta bisulfite, or hyposulfite, sodium thiosulfate, or isoascorbic acid, or sodium formaldehyde sulfoxylate. The free radical precursor and reducing agent together, referred to as a redox system herein, may be used at a level of from about 0.01% to 5%, based on the weight of monomers used. Examples of redox systems include: t-butyl hydroperoxide/sodium formaldehyde sulfoxylate/Fe(III); t-butyl hydroperoxide/isoascorbic acid/Fe(III); and ammonium persulfate/sodium bisulfite/sodium hydrosulfite/Fe(III). The polymerization temperature may be 10° C. to 110° C., depending upon such things as free radical initiator decomposition constant and reaction vessel pressure capabilities.

Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

Polymer A is present in the polymeric particles at preferably 10 to 95 percent, more preferably 30 to 70 percent, and most preferably 40 to 60 percent, by weight, based on the total weight of the polymeric particles, the remainder being substantially polymer B. Therefore, polymer B is present in the polymeric particles at preferably 90 to 5 percent, more preferably 70 to 30 percent, and most preferably 60 to 40 percent, by weight, based on the total weight of the polymeric particles. Polymer A and polymer B are prepared in separate polymerization stages. All of the monomers to be reacted in a given polymerization stage of an aqueous emulsion polymerization (i.e., for either polymer A or polymer B) may be present in the aqueous system at the start of that polymerization stage, or they may be added continuously or intermittently during the course of the polymerization stage. A polymerization stage may alternatively be carried out in such a way that the amounts of monomers, relative to each other, are changed continuously, or continually. The monomers may be added to the aqueous system in neat form, or as a monomer pre-emulsion in which the monomers have been emulsified in water, using surfactants. Free radical initiators may be introduced into the polymerization medium at the start of the polymerization, continuously or intermittently during the polymerization, or some combination thereof. Free radical initiators may further be added at or near the end of the polymerization stage as a chase to cause residual monomers to polymerize.

In the first and third aspects of the invention, the composition of polymer A includes: at least one copolymerized ethylenically unsaturated nonionic monomer having a water solubility less than 8% by weight, based on the weight of water; and at least one copolymerized acid monomer, such that the acid number of polymer A is preferably 13 to 260, more preferably 26 to 195, and most preferably 39 to 130. In the first and third aspects of the invention, the composition of Polymer B must be chosen so that at least 51% of the acid functional monomers contained, as polymerized units, in the polymeric particles reside in polymer A. The acid number of polymer B may be 0 to 65, preferably 0 to 25, more preferably 0 to 15, and most preferably 0 to 7.

In the first and third aspects of the present invention, the composition of polymer B must be chosen so that at least 51% of the acid functionality resides in polymer A.

In the second and fourth aspects of the present invention, the composition of polymer A includes: preferably 5–99.5%, more preferably 8–99.5%, most preferably 20–99.5% by weight, based on polymer A weight, of at least one copolymerized ethylenically unsaturated first nonionic monomer having a water solubility of 8% or more by weight, based on the weight of water; preferably 0–94.5%, more preferably 0–91.5%, and most preferably 0–79.5% by weight, based on polymer A weight, of at least one copolymerized ethylenically unsaturated second nonionic monomer having a water solubility of less than 8% by weight, based on the weight of water; and at least one copolymerized acid monomer, such that the acid number of polymer A is 3 to 100.

In the second and fourth aspects of the present invention, the composition of polymer B must be chosen so that at least 51% of copolymerized ethylenically unsaturated nonionic monomer having a water solubility of 8% or more by weight resides in polymer A.

The water solubility of the nonionic monomers incorporated into the emulsion polymers herein are defined as those determined using the Quantitative Structural Activity Relationship (QSAR) program. The program uses the molecular structure to estimate physical-chemical properties including, molecular weight, vapor pressure, solubility, bioconcentration factor, hydrolysis half-life, Henry's coefficient, partitioning data, and other parameters (based on Lyman, W., Reehl, W., and Rosenblatt, D. Handbook of Chemical Property Estimation Methods. Chapter 2 "Solubility in Water". McGraw Hill Book Co., New York, 1982). The QSAR database used to calculate the water solubility assessment is maintained by the Institute for Process Analysis, Montana State University (Bozeman, Mont., USA) and accessed through Tymnet Data Systems and Numerica Online Systems (Numericom. 1994. The Online Interface for Numerica Users. Technical Data Base Services, Inc. (TDS, 135 West 50th Street, New York, N.Y. 10020). Some water solubilities are presented in Table A.

TABLE A

Water solubilities of monomers

| Monomer | Water Solubility by QSAR Method (grams per 100 grams of water) |
|---|---|
| BA | 0.465 |
| EA | 2.88 |
| EHA | 0.0172 |
| MMA | 4.17 |
| Sty | 0.0672 |
| VA | 9.65 |
| AAEM | 8.00 |

A second polymeric component may, optionally, be added to the aqueous coating composition to form a blend. The second polymeric component may be soluble, insoluble, or partially soluble in water. There may be more than one second polymeric component. When such blends are formed, the weight ratio of the polymeric particles to the second polymeric component is 1/19 to 999/1, preferably 1/19 to 19/1, more preferably 1/4 to 9/1, and most preferably 3/7 to 4/1.

The primary criterion for the second polymeric component is that it be dispersed in water, dispersible in water, soluble in water, or partially soluble in water, so that it may be blended with the other components of the aqueous coating composition. When the second polymeric component is insoluble, it will usually be dispersed in water as particles. Although particles of the second polymeric component will often be present in the aqueous coating compositions, the term "polymeric particles" used herein is reserved for the particles containing both polymer A and polymer B. When the second polymeric component is intended to function as a binder to facilitate film formation during preparation of the coating, it is preferred that its Tg be −40° C. to 70° C. The second polymeric component could be prepared by any number of polymerization methods including emulsion, suspension, bulk, and solution polymerization. There are no particular compositional constraints for the second polymeric component. The monomers used to prepare the second polymeric component may be those polymerizable by free radical techniques (i.e., including any of those listed above for use in preparing the polymeric particles), or other techniques such as are involved in condensation polymerization. Typically, condensation polymers are prepared, by methods well known in the art, from reactive pairs of monomers, each of which is di-functional or multi-functional. Monomer pairs used to prepare condensation polymers include, for example: acid chlorides and amines; isocyanates and amines; and isocyanates and alcohols. The second polymeric component may also be a polyolefin such as, for example, is formed from the polymerization of ethylene, propylene, higher alkenes, and combinations thereof. The polyolefin may also contain, as polymerized units, conjugated dienes, non-conjugated dienes and functionalized alkenes. The methods of preparing polyolefins are well known in the art, and include Ziegler-Natta and metallocene techniques.

One or more nonionic surfactants may be added to the aqueous coating composition containing the polymeric particles to achieve further improvement of adhesion of subsequently formed coatings to friable surfaces. An effective amount of nonionic surfactant is 0.1–10 weight percent, preferably 0.25–10 weight percent, more preferably 0.5–8 weight percent, and most preferably 1–8 weight percent, calculated as dry weight of surfactant based on the total dry weight of the polymeric particles.

The nonionic surfactant includes those listed hereinabove as providing stabilization during emulsion polymerization. The nonionic surfactant is, preferably, chosen from the group including alkylphenol alkoxylates, alkoxylated amines, and alkyl alcohol alkoxylates. The nonionic surfactant is, more preferably, chosen from the group including alkylphenol ethoxylates, ethoxylated amines, alkyl alcohol ethoxylates, and mixtures thereof.

Useful alkylphenol alkoxylates have the general structure

R"—Ph—O—(R$_x$O)—R'—OH, where Ph is a phenyl group; R is $C_1$–$C_4$ alkyl or mixtures thereof, mixtures disposed randomly or in sequences (blocks), preferably ethyl; R' is $C_1$–$C_5$ alkyl; R" is $C_1$–$C_{24}$ alkyl; and "x" is preferably 1 to 100, more preferably 4 to 50, and most preferably 6–50. Alkylphenol alkoxylates include polyoxyethylene nonylphenol ethers, polyoxyethylene octylphenol ethers, tert-octylphenoxyethylpoly(39) ethoxyethanol, and nonylphenoxyethylpoly(40) ethoxyethanol. TRITON™ X-405 (70% aqueous), an alkylphenol ethoxylate, is available from Union Carbide Corporation.

Used herein, "alkoxylated amine" refers to an amine, the amine nitrogen of which is substituted with one, two, or three —(RO)$_x$R' groups, where R is $C_1$–$C_4$ alkyl or mixtures thereof, mixtures disposed randomly or in sequences (blocks), preferably ethyl, and where x is from 5–100. Further, the amine nitrogen may be substituted with 0–2 R" groups, where R" is a $C_1$–$C_{24}$ alkyl, aralkyl, or aromatic group, preferably each R" group is a $C_1$–$C_{24}$ alkyl selected such that the Iodine number of the water-soluble alkoxylated amine is less than 30, more preferably such that the Iodine number of the water-soluble alkoxylated amine is less than 15, in order to minimize the color of the alkoxylated amine. Preferred are tertiary amines, also referred to herein as t-amines. In any event, the alkoxylated amine is water-soluble at least to the amount that it is utilized in the aqueous coating composition at 25° C. Typical alkoxylated amines are the commercially available alkoxylated t-amines, ETHOX™ SAM-50, ETHOMEEN™ 18/25, and the primary alkoxylated amine, JEFFAMINE™ M-2070. ETHOMEEN™ 18/60 (33% aqueous), an ethoxylated tertiary amine, is available from Akzo Nobel Chemical, Inc.

Useful alkyl alcohol alkoxylates have the general structure

R"—O—(R$_x$O)—R'—OH, where R is $C_1$–$C_4$ alkyl or mixtures thereof, mixtures disposed randomly or in sequences (blocks), preferably ethyl; R' is $C_1$–$C_5$ alkyl; R" is $C_1$–$C_{30}$ alkyl; and "x" is preferably 1 to 100, more preferably 4 to 50, and most preferably 6–50. They include polyoxyethylene higher alcohol ethers such as, for example, polyoxyethylene lauryl ethers, polyoxyethylene stearyl ethers, and TERGITOL™ 15-S-40 (25% aqueous), an alkyl alcohol ethoxylate available from Union Carbide Corporation.

The aqueous coating composition of this invention may contain typical coating additives such as binders, fillers, defoamers, cross-linkers, catalysts, surfactants, stabilizers, anti-flocculants, tackifiers, coalescents, colorants, waxes, and pigments. It may be applied to the substrate surface by methods well known in the art such as air-assisted spray, airless spray, plural component spray, brush, roller, squeegee, and the like.

All ranges used herein are inclusive and combinable.

Glossary

Used herein, the following abbreviations and terms have these meanings:
AAEM≡2-(Acetoacetoxy)ethyl methacrylate
ALS≡Ammonium Lauryl Sulfate (28% active)
BA≡Butyl Acrylate
MAA≡Methacrylic Acid
MMA≡Methyl Methacrylate
n-DDM≡n-Dodecyl Mercaptan
SLS≡Sodium Lauryl Sulfate (28% active)
STY≡Styrene
VA≡Vinyl Acetate
Empl. No.≡example number
PEA≡pre-emulsion A
PEB≡pre-emulsion B
PVC≡pigment volume concentration
P.S.≡particle size in nanometers (nm)
redox≡reduction/oxidation (e.g., redox initiation system for polymerization)
volume solids≡the portion of the total volume of the aqueous dispersion that is occupied by nonvolatile material.

//=when used in the tables below, "//" is inserted between the compositions for each polymerization stage. For example, 50(60 X/40 Y)//50(90 X/10 Z) denotes that the polymerization is carried out in two stages, in the order given. The ratio of those stages is 50/50; the ratio of monomer X to monomer Y in the first polymerization stage is 60/40; the ratio of monomer X to monomer Z in the second polymerization stage is 90/10.

ATTAGEL™ 50 is available from Engelhard Minerals & Chemicals Corp., Houston, Tex.

ACRYSOL™ RM-2020NPR is available from Rohm and Haas Company, Philadelphia, Pa.

BUBBLEBREAKER™ 625 is available from Witco Corp., Phillipsburg, N.J.

ETHOMEEN™ 18/60 is an alkoxylated t-amines, available from Akzo Nobel Chemicals Inc., Charlestown, N.H.

MINEX™ 4 is available from Unimin Specialty Minerals Inc., Tamms, Ill.

NATROSOL™ 250 HBR is available from Hercules Incorporated, New York, N.Y.

TAMOL™ 1124 is a surfactant available from Rohm and Haas Company, Philadelphia, Pa.

TERGITOL™ 15-S-40 is $C_{11}$–$C_{15}$ secondary alcohol ethoxylate available from Union Carbide of Danbury, Conn.

TEXANOL™ is available from Eastman Chemicals, Eastman, Tenn.

TI-PURE™ R-902 is titanium dioxide, available from DuPont Company of Wilmington, Del.

TABLE 1

Weights (in grams) of monomers used in Pre-Emulsion A.

| PEA-[a] | BA | MMA | MAA | Other Monomer | Amount of Other Monomer |
|---|---|---|---|---|---|
| B | 417.8 g | 272.3 g | 60.0 g | | |
| 1 | 417.8 | 332.3 | | | |
| 2 | 417.8 | 332.3 | | | |
| 3 | 417.8 | 332.3 | | | |
| 4 | 417.8 | 332.3 | | | |
| 5 | 417.8 | 272.3 | 60.0 | | |
| 6 | 417.8 | 332.3 | | | |
| 7 | 252.0 | 498.0 | | | |
| 8 | 417.8 | | | STY | 332.3 g |
| 13 | 417.8 | 332.3 | | ALMA | 7.5 |

[a]"PEA" is an abbreviation meaning herein "pre-emulsion A". The alphanumeric character following the hyphen of "PEA-" corresponds to the Example in which the pre-emulsion is used. For example, PEA-7 is used in Example 7, and PEA-B is used in Comparative Example B. In each case, PEA is formed by combining the monomers listed with deionized water (250 g) and SLS (8.2 g).

TABLE 2

Weights (in grams) of monomers and other reactant used in Pre-Emulsion B.

| PEB-[a] | BA | MMA | MAA | Chain Transfer Agent | Amount of Chain Transfer Agent |
|---|---|---|---|---|---|
| B | 417.8 g | 332.3 g | | | |
| 1 | 417.8 | 317.8 | 15.0 g | | |
| 2 | 417.8 | 287.3 | 45.0 | | |
| 3 | 417.8 | 272.3 | 60.0 | | |
| 4 | 417.8 | 257.3 | 75.0 | | |
| 5 | 417.8 | 332.3 | | | |
| 6 | 417.8 | 272.3 | 60.0 | n-DDM | 7.5 g |
| 7 | 417.8 | 272.3 | 60.0 | | |
| 8 | 417.8 | 272.3 | 60.0 | | |
| 13 | 417.8 | 272.3 | 60.0 | | |

[a]"PEB" is an abbreviation meaning herein "pre-emulsion B". ". The alphanumeric character following the hyphen of "PEB-" corresponds to the Example in which the pre-emulsion is used. For example, PEB-7 is used in Example 7, and PEB-B is used in Comparative Example B. The chain transfer agent is n-DDM. In each case, PEB is formed by combining the monomers and, in the case of PEB-6, n-DDM, with deionized water (250 g) and SLS (8.2 g).

COMPARATIVE EXAMPLE A

Preparation of an Aqueous Dispersion of Single-Stage Polymeric Particles.

A five-liter flask was charged with 1800 g deionized water and heated to 87° C. while being swept with nitrogen gas ($N_2$). A monomer pre-emulsion was prepared from 494 g deionized water, 16.1 g SLS, 835.5 g BA, 604.5 g MMA and 60.0 g MAA. SLS (49.3 g) and 3.74 g ammonium persulfate were added to the flask along with 60 g deionized water. The monomer pre-emulsion was then added during two hours at 85° C. Over the course of the reaction, 0.82 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate, and 0.008 g of iron sulfate heptahydrate were added in a total of 105 g deionized water. A solution of 13.0 g of 28% aqueous ammonium hydroxide in 45 g deionized water was then added. Deionized water rinses were added throughout the polymerization. The aqueous dispersion of emulsion polymer had a solids content of 32.4% by weight, a particle size of 46 nm and a pH of 7.4.

COMPARATIVE EXAMPLE B, EXAMPLES 1–8 and 13

Preparation of an Aqueous Dispersion of the Polymeric Particles. The Numbering of Each Pre-Emulsion A and Pre-Emulsion B Matches the Example Number. (E.g., PEA-5 and PEB-5 Are Used in Example 5.)

A five-liter flask was charged with 1500 To 1800 g deionized water (1500 g for Comparative Example B; 1900 g for Example 5; and 1800 g for all others). The flask and its deionized water charge were then heated to 87° C. while being swept with $N_2$. A monomer pre-emulsion A (PEA) was prepared from 250 g deionized water, 8.2 g SLS, and monomers listed in Table 1. In the procedures of Examples 1–8 and 13, 49.5 g SLS and 3.74 g ammonium persulfate were added to the flask along with 60 g deionized water. In the procedure of Comparative Example B, the amount of SLS was reduced to 2.0 g. The monomer pre-emulsion A was then added over one hour at 85° C. After completion of addition of the PEA and a hold period of five minutes, a monomer pre-emulsion B prepared from 250 g deionized water, 8.2 g SLS and the monomers (n-DDM was also an ingredient in PEB-6) listed in Table 2 was added during one hour at 85° C. Throughout the two-hour period during which first PEA and then PEB were added, 0.82 g ammonium persulfate dissolved in 120 g deionized water was also added to the flask in a separate stream. When the addition was complete, the flask was cooled to 65° C. and 2.24 g of 70% aqueous t-butyl hydroperoxide, 1.12 g sodium formaldehyde sulfoxylate and a 0.008 g of iron sulfate heptahydrate were added in a total of 105 g deionized water. A solution of 13.0 g of 28% aqueous ammonium hydroxide in 40 g deionized water was then added. Deionized water rinses were added throughout the polymerization. Characteristics of the aqueous dispersions of polymeric particles are listed in Table 3.

TABLE 3

Characteristics of Aqueous Dispersions of Polymeric Particles prepared in Comparative Example B, Examples 1–8, and 13.

| Example | Solids Level as Weight % of Total Aqueous Dispersion | Particle Size in nanometers, nm | pH |
| --- | --- | --- | --- |
| Comp. B | 38.2 | 146 | 7.9 |
| 1 | 34.5 | 48 | 9.2 |
| 2 | 33.9 | 45 | 7.0 |
| 3 | 35.4 | 51 | 7.1 |
| 4 | 35.4 | 51 | 7.0 |
| 5 | 33.6 | 48 | 7.7 |
| 6 | 35.5 | 45 | 7.1 |
| 7 | 35.5 | 49 | 7.1 |
| 8 | 36.4 | 53 | 7.0 |
| 13 | 33.9 | 45 | 9.5 |

EXAMPLE 9

Preparation of Two-Stage Polymeric Particles Having Polymer A Formed During the Second Polymerization Stage.

A five-liter flask was charged with 2100 g deionized water and heated to 67° C. while being swept with $N_2$. A monomer pre-emulsion A was prepared from 250 g deionized water, 8.2 g SLS, 417.8 g BA, 332.3 g MMA. SLS (49.5 g) along with 5% of the total monomer pre-emulsion A was added to the flask. Ammonium persulfate (0.2 g), 0.4 g isoascorbic acid and 0j.03 g iron sulfate heptahydrate were added to the flask along with 40 g deionized water. The monomer pre-emulsion A was then added during one hour at 65° C. After completion of the PEA addition and a hold period of five minutes, a monomer pre-emulsion B prepared from 250 g deionized water, 8.2 g SLS, 417.8 g BA, 272.3 g MMA and 60.0 g MAA was added during one hour at 65° C. Throughout the two-hour period during which first pre-emulsion A and then pre-emulsion B were added, 6.4 g t-butyl hydroperoxide and 5.3 g isoascorbic acid dissolved in a total of 240 g deionized water was also added to the flask in a separate stream. When the addition was complete, the contents of the flask were cooled to 65° C. and a solution of 1.28 g of 70% aqueous t-butyl hydroperoxide, 1.04 g isoascorbic acid, and 100 g deionized water was added. A solution of 13.0 g of 28% aqueous ammonium hydroxide in 40 g deionized water was then added. Deionized water rinses were added throughout the polymerization. The aqueous dispersion of the polymeric particles had a solids content of 30.3% by weight, a particle size of 51 nm and a pH of 7.0.

EXAMPLE 10

Preparation of a Three-Stage Polymeric Particles in Which Polymer A is Formed During the Second of Three Polymerization Stages.

A five-liter flask was charged with 1600 g deionized water and heated to 87° C. while being swept with $N_2$. A monomer pre-emulsion A was prepared from 200 g deionized water, 6.3 g SLS, 232.0 g BA, and 232.0 g MMA. SLS (38.5 g) and 2.9 g ammonium persulfate were added to the flask along with 50 g deionized water. The monomer pre-emulsion A was then added during one hour at 85° C. After completion of the PEA addition and a hold period of five minutes, a monomer pre-emulsion B prepared from 200 g deionized water, 6.3 g SLS, 232.0 g BA, 195.0 g MMA and 37.0 g MAA was added during one hour at 85° C. Throughout the two-hour period during which first pre-emulsion A and then pre-emulsion B were added, 0.65 g ammonium persulfate dissolved in 120 g deionized water was added to the flask in a separate stream. When the addition was complete, the flask was cooled to 65° C. and 0.06 g N,N-diethylhydroxylamine was added. Next, 185.0 g BA and 46.0 g MMA were added to the reaction mixture at 65° C., during 10 minutes. A 70% aqueous t-butyl hydroperoxide solution (2.25 g), 1.12 g sodium formaldehyde sulfoxylate, and a 0.008 g of iron sulfate heptahydrate were added in a total of 50 g deionized water. After 15 minutes, the flask was cooled to 60° C., and 2.24 g 70% aqueous t-butyl hydroperoxide and 1.12 g sodium formaldehyde sulfoxylate, dissolved in a total of 50 g deionized water, were added. Next, 13.0 g of a solution of 28% aqueous ammonium hydroxide in 40 g deionized water was added. Deionized water rinses were added throughout the polymerization. The dispersion of polymeric particles had a solids content of 35.5% by weight, a particle size of 50 nm and a pH of 7.4.

EXAMPLE 11

Preparation of Emulsion Polymer Having Polymer B in the First Polymerization Stage (70 weight %) and Polymer A in the Second Polymerization Stage (30 weight %).

A five-liter flask was charged with 1800 g deionized water and heated to 87° C. while being swept with $N_2$. A monomer pre-emulsion A was prepared from 350 g deionized water, 11.5 g SLS, 585.0 g BA, and 465.0 g MMA. SLS (49.5 g) and 3.74 g ammonium persulfate were added to the flask along with 60 g deionized water. The PEA was then added during one hour at 85° C. After completion of the addition and a hold period of five minutes, a monomer preemulsion B, prepared from 150 g deionized water, 5.0 g SLS, 250.7 g BA, 163.0 g MMA and 36.0 g MAA, was added during one hour. Throughout the two-hour period during which first the PEA and then the PEB were added, 0.82 g ammonium persulfate dissolved in 120 g deionized water was also added to the flask in a separate stream. When the addition was complete, the flask was cooled 65° C. and a solution of 2.24 g of 70% aqueous t-butyl hydroperoxide, 1.12 g sodium formaldehyde sulfoxylate and 0.008 g of iron sulfate heptahydrate in 105 g deionized water was added. Next, a solution of 13.0 g of 28% aqueous ammonium hydroxide in 40 g deionized water was added. Deionized water rinses were added throughout the polymerization. The aqueous dispersion of polymeric particles had a solids content of 34.5% by weight, a particle size of 48 nm and a pH of 6.8.

EXAMPLE 12

Preparation of an Aqueous Dispersion of a Polymeric Particles Having Polymer A in the Second Polymerization Stage, Wherein Polymer A Includes, as Polymerized Units, a Water-Soluble Monomer.

A five-liter flask was charged with 1350 g deionized water and heated to 87° C. while being swept with $N_2$. A monomer pre-emulsion A was prepared from 185 g deionized water, 6.2 g SLS, 313.4 g BA, and 250.0 g MMA. SLS (50.0 g) and 2.8 g ammonium persulfate were added to the flask, along with 40 g deionized water. The monomer PEA was then added during one hour at 85° C. After completion of the PEA and a hold period of five minutes, a 0.008 gof iron sulfate heptahydrate and 0.5 g ammonium persulfate in a total of 25 g deionized water were added to the reaction mixture. A monomer preemulsion B, prepared from 185 g deionized water, 1.0 g ammonium bicarbonate, 6.2 g SLS, 107.5 g BA, 453.8 g VA, and 2.8 g MAA was then added during one hour at 78° C. During the course of feeding the monomer PEB, a solution of 1.1 g ammonium persulfate, 0.34 g isoascorbic acid, and 120 g deionized water was also added to the flask in a separate stream. When the addition was complete, the contents of the flask were cooled to 65° C., and a solution of 2.24 g of 70% aqueous t-butyl hydroperoxide, 1.12 g isoascorbic acid, and 100 g deionized water was added. Deionized water rinses were added throughout the polymerization. The aqueous dispersion of polymeric particles had a solids content of 35.8% by weight, a particle size of 65 nm and a pH of 4.6.

TABLE 4

Ingredients for preparation of the aqueous coating composition.

| Material | Weight (grams) |
|---|---|
| Grind Premix Ingredients | |
| NATROSOL ™ 250 HBR (2.5% Aqueous solution) | 41.88 |
| Propylene glycol | 6.94 |
| BUBBLEBREAKER ™ 625 | 0.39 |
| TAMOL ™ 1124 | 1.56 |
| TI-PURE ™ R-902 | 39.9 |
| MINEX ™ 4 | 47.48 |
| ATTAGEL ™ 50 | 1.23 |
| Let Down Ingredients | |
| aqueous dispersion of polymeric particles | 108.84 |
| TEXANOL ™ | 2.53 |
| BUBBLEBREAKER ™ 625 | 0.39 |
| ACRYSOL ™ RM-2020NPR | 1.0 |
| Water | 19.67 |

COMPARATIVE EXAMPLE C

Aqueous Coating Composition Incorporating Single-Stage Polymeric Particles.

Following the recipe given in Table 4, an aqueous coating composition was made incorporating the aqueous dispersion of the polymeric particles prepared in Comparative Example A. The Grind Premix was made and mixed on a high speed Cowles disperser for 20 minutes. The Grind Premix was transferred to another container and the Let Down ingredients were added in the order given. The final volume solids of the aqueous coating composition was 30 percent and the pigment volume concentration (PVC) was 45%.

COMPARATIVE EXAMPLE D AND EXAMPLES 14–26.

Aqueous Coating Composition Incorporating Multi-Stage Polymeric Particles.

Using the procedure of Comparative Example C, Comparative Example D and Examples 14–26 were prepared. Table 5 lists the pertinent information for each example. Consistent with Comparative Example C, the final volume solids of the aqueous coating composition was 30 percent and the PVC was 45%.

EXAMPLE 27.

Example 27 was prepared by the same procedure used for Example 14, except that TERGITOL™ 15-S-40 was added to the aqueous coating composition such that there was 4% by weight solid TERGITOL™ 15-S-40, based on total weight of the polymeric particles in Example 14.

TABLE 5

Characteristics of aqueous coating compositions prepared in Comparative Examples C and D, and Examples 14–27 and 30.

| Empl. No. | Empl. No. | Composition[a] of polymeric particles in the aqueous dispersion of the polymeric particles prepared in Comparative Examples A and B, and Examples 1–13 and Example 28. | P.S. (nm) | number of polymer phases |
|---|---|---|---|---|
| Comp. C | Comp. A | 55.7 BA/40.3MMA/4.0MAA | 46 | 1 |
| Comp. D | Comp. B | 50(55.7 BA/36.3MMA/8MAA)//50(55.7BA/44.3MMA) | 146 | 2 |
| 14 | 1 | 50(55.7BA/44.3MMA)//50(55.7 BA/42.3MMA/2MAA) | 48 | 2 |
| 15 | 2 | 50(55.7BA/44.3MMA)//50(55.7 BA/38.3MMA/6MAA) | 45 | 2 |
| 16 | 3 | 50(55.7BA/44.3MMA)//50(55.7 BA/36.3MMA/8MAA) | 51 | 2 |
| 17 | 4 | 50(55.7BA/44.3MMA)//50(55.7 BA/34.3MMA/10MAA) | 51 | 2 |
| 18 | 5 | 50(55.7 BA/36.3MMA/8MAA)//50(55.7BA/44.3MAA) | 48 | 2 |
| 19 | 6 | 50(55.7BA/44.3MMA)//50(55.2BA/35.9MMA/7.9MAA/1.0n-DDM) | 45 | 2 |
| 20 | 7 | 50(33.6BA/66.4MMA)//50(55.7 BA/36.3MMA/8MAA) | 49 | 2 |
| 21 | 8 | 50(55.7BA/44.3Sty)//50(55.7 BA/36.3MMA/8MAA) | 53 | 2 |
| 22 | 9 | 50(55.7BA/44.3MMA)//50(55.7 BA/36.3MMA/8MAA) | 51 | 2 |
| 23 | 10 | 80(55.7BA/44.3MMA)//50(55.7 BA/36.3MMA/8MAA))//20(80BA/20MMA) | 50 | 3 |
| 24 | 11 | 70(55.7BA/44.3MMA)//30(55.7 BA/36.3MMA/8MAA) | 48 | 2 |
| 25 | 12 | 50(55.7BA/44.3MMA)//50(19.1 BA/80.4VAc/0.5MAA) | 65 | 2 |
| 26 | 13 | 50(55.7BA/43.3MMA/1ALMA)//50(55.7 BA/36.3MMA/8MAA) | 45 | 2 |
| 27 | 1 | 50(55.7BA/44.3MMA)//50(55.7 BA/42.3MMA/2MAA) + 4% Tergitol 15-S-40 | 48 | 2 |

[a]All compositions of Table 5, and of all other tables in which they appear herein, are denoted as follows:
the symbol "//" separates compositions polymerized in different polymerization stages;
parentheses enclose the feed compositions that were polymerized in each polymerization stage;
"BA", "MMA", and other such abbreviations within the parentheses denote ingredients (monomers, or n-DDM).;
the number immediately preceding each ingredient abbreviation within the parentheses denotes the weight percent of that ingredient based on the total weight of all ingredients indicated for that polymerization stage;
the number preceding the parenthesis at the beginning of the compositional information for each stage denotes the weight percent of that stage, based on the total weight of all of the stages.

Weathered Chalk Adhesion Tests of Aqueous Coating Compositions.

Chalk adhesion was evaluated for all the aqueous coating compositions using the following procedure: The aqueous coating compositions were applied using a brush over a weathered piece of aluminum siding. The siding had been exposed outside on a house for an unspecified number of years, and had a chalky outer layer that was typically about 25 μm thick. The chalky layer is composed of the remnants of the inorganic particles (metal oxides, various silicates, and possibly metal carbonates) that were present in the original coating composition.

The aqueous coating compositions of Comparative Examples C and D, and Examples 14–27 were applied in separated tests. In each test, two coats were applied, each coat being approximately 1 gram of liquid aqueous coating composition per 97 cm² (=1 gram per 15 in²). The coats were allowed to dry at ambient conditions during an interval of two hours between applications. The coated panels were then dried at ambient conditions for approximately 24 hours. ASTM crosshatch tape pull test method D-3359 was used to evaluate the adhesion. The percent of coating retained after pulling off the tape was recorded. A reading of 100% indicates complete adhesion while a reading of 0% indicates complete removal. While a value of 100% is desired, experience has shown that values of greater than about 20% are indicative of good adhesion. The adhesion data is given in Tables 6–14.

TABLE 6

Effect of particle size and compositional staging of the polymeric particles.

| Empl. | Composition | P.S. (nm) | # of phases | X-hatch adhesion |
|---|---|---|---|---|
| Comp. C | 55.7 BA/40.3MMA/4.0MAA | 46 | 1 | 11% |
| Comp. D | 50(55.7 BA/36.3MMA/8MAA)//50(55.7BA/44.3MMA) | 146 | 2 | 0% |
| 16 | 50(55.7BA/44.3MMA)//50(55.7 BA/36.3MMA/8MAA) | 51 | 2 | 96% |

The results in Table 6 show that making the polymer in a multi-stage process which places the majority of the acid in one stage leads to a polymer with substantially improved adhesion. The results also show that a particle size of about 50 nm for the polymeric particles results in better adhesion than does a particle size of about 145 nm.

TABLE 7

Effect of acid (derived from polymerized MAA) level in Polymer A.

| Empl. | Composition | Polymer A[a] Acid # | P.S. (nm) | # of phases | X-hatch adhesion |
|---|---|---|---|---|---|
| 14 | 50(55.7BA/44.3MMA)//50(55.7 BA/42.3MMA/2MAA) | 13[b] | 48 | 2 | 75% |
| 15 | 50(55.7BA/44.3MMA)//50(55.7 BA/38.3MMA/6MAA) | 39[b] | 45 | 2 | 71% |
| 16 | 50(55.7BA/44.3MMA)//50(55.7 BA/36.3MMA/8MAA) | 52[b] | 51 | 2 | 96% |
| 17 | 50(55.7BA/44.3MMA)//50(55.7 BA/34.3MMA/10MAA) | 65[b] | 51 | 2 | 93% |

TABLE 7-continued

Effect of acid (derived from polymerized MAA) level in Polymer A.

| Empl. | Composition | Polymer A[a] Acid # | P.S. (nm) | # of phases | X-hatch adhesion |
|---|---|---|---|---|---|
| Comp. C | 55.7 BA/40.3MMA/4.0MAA | 26[c] | 46 | 1 | 11% |

[a]Polymer A was prepared in the second polymerization stage (denoted by the appearance of its composition after the "//" in the designation of the full composition) in Examples 14–17.
[b]The average acid number for the entire composition is one-half of the acid number shown here for Polymer A.
[c]Comparative Example C is a single-stage polymer having an acid number equal to the average acid number of the entire composition of Example 16.

Comparison of Example 16 with Comparative Example C results in Table 7 reveals that, in spite of having identical average acid numbers (i.e., 26) and similar particle sizes, the single-stage polymer of Comparative Example C imparts poor adhesion (11%) to coatings formed from its aqueous coating composition, while the two-stage polymer of Example 16, having all of the acid in the Polymer A stage, imparts excellent adhesion performance (96%). In fact, adhesion performance is still very good (>70%) for two-stage polymers having average acid numbers as low as 6.5 (i.e., Example 14).

TABLE 8

Effect of order of making the high acid phase

| Empl. | Composition of the polymeric particles | P.S. (nm) | # of phases | X-hatch adhesion |
|---|---|---|---|---|
| 18 | 50(55.7 BA/36.3MMA/8MAA)//50(55.7BA/44.3MMA) | 48 | 2 | 62% |
| 16 | 50(55.7BA/44.3MMA)//50(55.7 BA/36.3MMA/8MAA) | 51 | 2 | 96% |
| Comp. C | 55.7 BA/40.3MMA/4.0MAA | 46 | 1 | 11% |

The results of Table 8 show that the benefit of having a separate high acid stage (Polymer A) rather than a single stage having an acid content equal to the average acid content of the two-stage polymers. The first stage of the polymeric particles of Example 18 is Polymer A, while the second stage of the polymeric particles of Example 16 is Polymer A. The aqueous coating compositions of both Example 16 and 18 form coatings with very good adhesion to chalky surfaces, while Comparative Example C, containing the single stage polymeric particles, forms coatings with poor adhesion performance.

TABLE 9

Effect of chain transfer agent, crosslinker, and polymer Tg.

| Empl. | Composition of the polymeric particles | P.S. (nm) | # of phases | X-hatch adhesion |
|---|---|---|---|---|
| 19 | 50(55.7BA/44.3MMA)//50(55.7 BA/36.3MMA/8MAA//1nDDM) | 45 | 2 | 42% |
| 20 | 50(33.6BA/66.4MMA)//50(55.7 BA/36.3MMA/8MAA) | 49 | 2 | 90% |

TABLE 9-continued

Effect of chain transfer agent, crosslinker, and polymer Tg.

| Empl. | Composition of the polymeric particles | P.S. (nm) | # of phases | X-hatch adhesion |
|---|---|---|---|---|
| 26 | 50(55.7BA/43.3MMA/ 1ALMA)// 50(55.7 BA/36.3MMA/8MAA) | 45 | 2 | 55% |
| Comp. C | 55.7 BA/40.3MMA/4.0MAA | 46 | 1 | 11% |

The results of Table 9 show that incorporation of chain transfer agent (n-DDM) or crosslinker (ALMA) into two-stage polymeric particles, or increasing its Tg, continues to give substantial improvement in adhesion compared with single-stage polymeric particles having the acid component (MAA) distributed evenly throughout.

TABLE 10

Effect of the Ratio of Polymer A to Polymer B.

| Empl. | Composition of the polymeric particles | P.S. (nm) | # of phases | X-hatch adhesion |
|---|---|---|---|---|
| 16 | 50(55.7BA/44.3MMA)// 50(55.7 BA/36.3MMA/8MAA) | 51 | 2 | 96% |
| 24 | 70(55.7BA/44.3MMA)// 30(55.7 BA/36.3MMA/8MAA) | 48 | 2 | 43% |
| Comp. C | 55.7 BA/40.3MMA/4.0MAA | 46 | 1 | 11% |

The results of Table 10 show that very good adhesion performance derives from a separate high acid stage (i.e., Polymer A) in the polymeric particles even when the level of high acid phase is only 30% of the total polymer composition. This is true in spite of the lower overall MAA level of the polymeric particles of Example 24 (2.4%) when compared with that of Comparative Example C and Example 16 (4.0%).

TABLE 11

Effect of initiation type and polymer composition.

| Empl. | Composition of the polymeric particles | Initiator type | P.S. (nm) | # of phases | X-hatch adhesion |
|---|---|---|---|---|---|
| 21 | 50(55.7BA/44.3Sty)// 50(55.7 BA/36.3MMA/8MAA) | (a) | 53 | 2 | 54% |
| 22 | 50(55.7BA/44.3MMA)// 50(55.7 BA/36.3MMA/8MAA) | (b) | 51 | 2 | 33% |
| Comp. C | 55.7 BA/40.3MMA/ 4.0MAA | (a) | 46 | 1 | 11% |

(a) The initiator was ammonium persulfate. Ammonium persulfate, used by itself, functions as a thermal initiator.
(b) The initiator includes ammonium persulfate, isoascorbic acid, and iron sulfate heptahydrate. This initiation system functions as a redox system.

Table 11 shows that the benefit of having a separate high acid stage (Polymer A) is seen even when Polymer B is a styrene/acrylic copolymer rather that an all acrylic polymer. Further, comparison of Example 22 with Comparative Example C and Example 21 reveals that the two-stage polymeric particles can be prepared using either thermal initiation or redox (reduction/oxidation) initiation.

TABLE 12

Effect of additional polymer stages.

| Empl. | Composition of the polymeric particles | P.S. (nm) | # of phases | X-hatch adhesion |
|---|---|---|---|---|
| 23 | 80(50(55.7BA/44.3MMA)// 50(55.7 BA/36.3MMA/ 8MAA))// 20(80BA/20MMA) | 50 | 3 | 38% |
| Comp. C | 55.7 BA/40.3MMA/4.0MAA | 46 | 1 | 11% |

Table 12 shows that the benefit of having a separate high acid stage (Polymer A) is seen even when the polymeric particles are designed to contain more than two separate polymer stages.

TABLE 13

Effect of Hydrophilic monomers.

| Empl. | Composition of the polymeric particles | P.S. (nm) | # of phases | X-hatch adhesion |
|---|---|---|---|---|
| 25 | 50(55.7BA/44.3MMA)// 50(19.1 BA/80.4VAc/0.5MAA) | 65 | 2 | 67% |
| Comp. C | 55.7 BA/40.3MMA/4.0MAA | 46 | 1 | 11% |

Table 13 reveals good adhesion for polymeric particles having a separate stage (Polymer A) containing a water soluble monomer (i.e., one with a water solubility greater than 8% at 25° C.) even if the acid number for that stage is below 13. The acid number for the Polymer A portion of the polymeric particles of Example 25 is only about 3. The average acid number for the polymeric particles is less than 2.

TABLE 14

Addition of nonionic surfactant.

| Empl. | Composition of the polymeric particles | P.S. (nm) | # of phases | X-hatch adhesion |
|---|---|---|---|---|
| 14 | 50(55.7BA/44.3MMA)// 50(55.7 BA/42.3MMA/2MAA) | 48 | 1 | 75% |
| 27 | 50(55.7BA/44.3MMA)// 50(55.7 BA/42.3MMA/ 2MAA) + 4% Tergitol 15-S-40 | 48 | 2 | 94% |
| Comp. C | 55.7 BA/40.3MMA/4.0MAA | 46 | 1 | 11% |

Table 14 shows that the addition of a nonionic surfactant to a coating composition containing two-stage polymeric particles gives a further improvement in the adhesion performance beyond that imparted by the presence of a separate MAA containing stage.

We claim:
1. A method for producing a coating on a friable surface comprising:
 (1) applying to said friable surface a layer of an aqueous coating composition comprising a plurality of polymeric particles, each of said particles consisting essentially of:
  (a) at least one polymer A having a glass transition temperature of −20° C. to 100° C.,
  wherein said polymer A is an emulsion polymer comprising:
   (i) 5–99.5% by weight, based on said polymer A weight, of at least one copolymerized ethylenically unsaturated first nonionic monomer having a water solubility at 25° C. of 8% or more by weight, based on the weight of water;

(ii) 0–94.5% by weight, based on said polymer A weight, of at least one copolymerized ethylenically unsaturated second nonionic monomer having a water solubility at 25° C. of less than 8% by weight, based on the weight of water; and (iii) at least one copolymerized acid monomer, such that the acid number of said polymer A is 3 to 100 mg of KOH per g of polymer; and (b) at least one polymer B having a glass transition temperature of −20° C. to 100° C., wherein said polymer B is an emulsion polymer comprising, as polymerized units, at least one ethylenically unsaturated nonionic monomer, wherein said particles have an average particle diameter less than 120 nanometers; and (2) drying said coating composition.

2. The method of claim 1, wherein said polymer A has an acid number of 3 to 26 mg of KOH per g of polymer.

3. The method of claim 1, wherein said polymer A is present at 10 to 95 percent by weight, based on the total weight of said particles.

4. The method of claim 1, wherein said polymer A is present at 30 to 70 percent by weight, based on the total weight of said particles.

5. The method of claim 1, wherein said particles have an average particle diameter of less than 80 nanometers.

6. The method of claim 1, wherein said aqueous coating composition further comprises at least one nonionic surfactant in the amount 0.25 to 10 weight percent, as dry weight of said surfactant, based on the total dry weight of said particles.

7. The method of claim 6, wherein said nonionic surfactant is a surfactant selected from the group consisting of alkylphenol alkoxylate, alkoxylated amine, alkyl alcohol alkoxylate, and mixtures thereof.

8. The method of claim 1, wherein said friable surface is selected from the group consisting of weathered paint, masonry, wall board, weathered uncoated wood, and gypsum.

9. The method of claim 1, wherein said aqueous coating composition additionally comprises at least one second polymeric component.

* * * * *